United States Patent
Lee

(10) Patent No.: US 9,958,147 B2
(45) Date of Patent: May 1, 2018

(54) WATERPROOF SOCKET-TYPE HALOGEN LAMP FOR LIVESTOCK BARN WITH IMPROVED HANDLING

(71) Applicant: RYUARM CO., LTD., Changcheongnam-do (KR)

(72) Inventor: Jae-Yeup Lee, Chungcheongnam-do (KR)

(73) Assignee: RYUARM CO., LTD., Chungcheongnam-Do (KR)

( * ) Notice: Subject to any disclaimer, the term of this patent is extended or adjusted under 35 U.S.C. 154(b) by 0 days. days.

(21) Appl. No.: 15/314,878

(22) PCT Filed: Nov. 16, 2016

(86) PCT No.: PCT/KR2016/013198
§ 371 (c)(1),
(2) Date: Nov. 29, 2016

(87) PCT Pub. No.: WO2017/086691
PCT Pub. Date: May 26, 2017

(65) Prior Publication Data
US 2017/0299171 A1  Oct. 19, 2017

(30) Foreign Application Priority Data
Nov. 16, 2015 (KR) .......... 10-2015-0160207

(51) Int. Cl.
*F21V 23/00* (2015.01)
*F21V 31/00* (2006.01)
(Continued)

(52) U.S. Cl.
CPC ............. *F21V 31/005* (2013.01); *A01K 1/00* (2013.01); *A01K 29/00* (2013.01); *F21V 17/00* (2013.01);
(Continued)

(58) Field of Classification Search
CPC ...... F21V 31/005; F21V 19/006; F21V 31/00; F21V 23/001; F21V 23/06
See application file for complete search history.

(56) References Cited

U.S. PATENT DOCUMENTS 3,582,868 A * 6/1971 Trimble .............. F21V 19/0005
174/DIG. 8
2013/0258681 A1* 10/2013 Wu ........................ F21V 31/005
362/374

FOREIGN PATENT DOCUMENTS

KR  100907782  9/2009

* cited by examiner

Primary Examiner — Karabi Guharay
(74) Attorney, Agent, or Firm — IPLA P.A.; James E. Bame

(57) ABSTRACT

A waterproof socket-type halogen lamp for a livestock barn comprises a fixing body forming a hollow part, a side plate finishing the outside of the fixing body, a contact point, a wire, an annular insulator insulating the fixing body, a spring which is embedded in the hollow part and of which an outer side is supported by the side plate, an inner side supports the outer side of the annular insulator to provide restoration force while supporting one terminal of the tube halogen lamp through the contact point, and an inner waterproof packing which prevents moisture or dust from penetrating to the inner end of the fixing body and has a closed curve shape with a terminal passing groove through which a lamp terminal housing passes, and a tube halogen lamp in which lamp terminals at both ends are connected with the contact point by two socket parts.

4 Claims, 6 Drawing Sheets

(51) Int. Cl.
*A01K 1/00* (2006.01)
*F21V 27/02* (2006.01)
*F21V 17/00* (2006.01)
*F21V 17/10* (2006.01)
*F21V 17/16* (2006.01)
*F21V 19/00* (2006.01)
*H01K 1/42* (2006.01)
*H01K 3/12* (2006.01)
*A01K 29/00* (2006.01)
*F21V 23/06* (2006.01)

(52) U.S. Cl.
CPC .............. *F21V 17/10* (2013.01); *F21V 17/16* (2013.01); *F21V 19/00* (2013.01); *F21V 19/006* (2013.01); *F21V 23/00* (2013.01); *F21V 23/001* (2013.01); *F21V 23/06* (2013.01); *F21V 27/02* (2013.01); *F21V 31/00* (2013.01); *H01K 1/42* (2013.01); *H01K 3/12* (2013.01)

[Fig. 1]
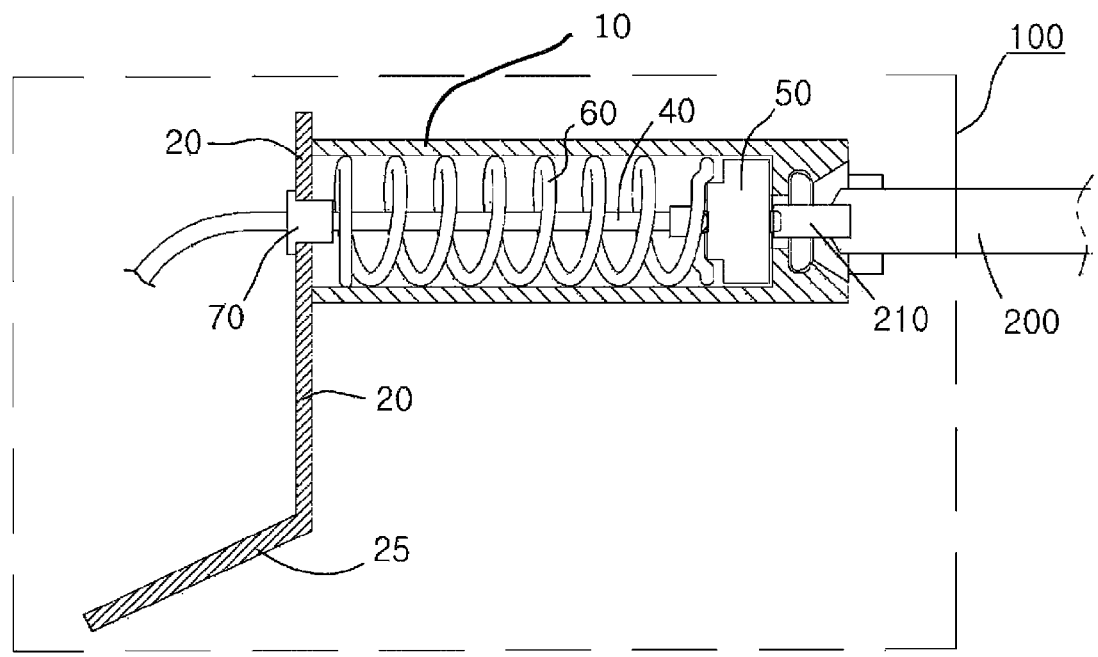

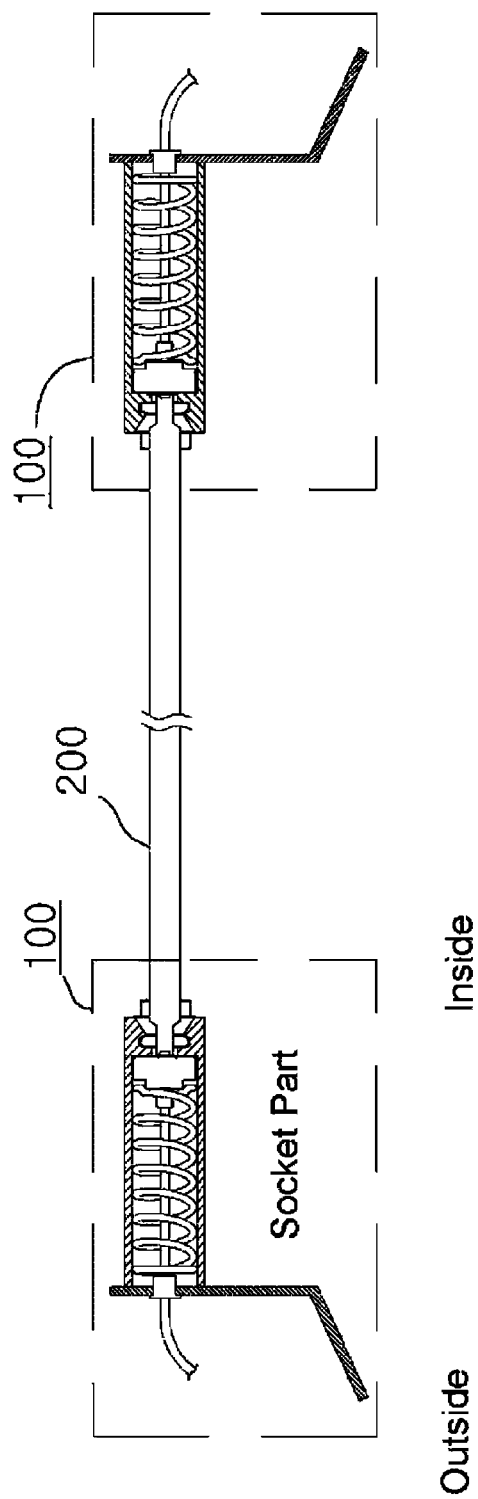
[Fig. 2]

[Fig. 3]
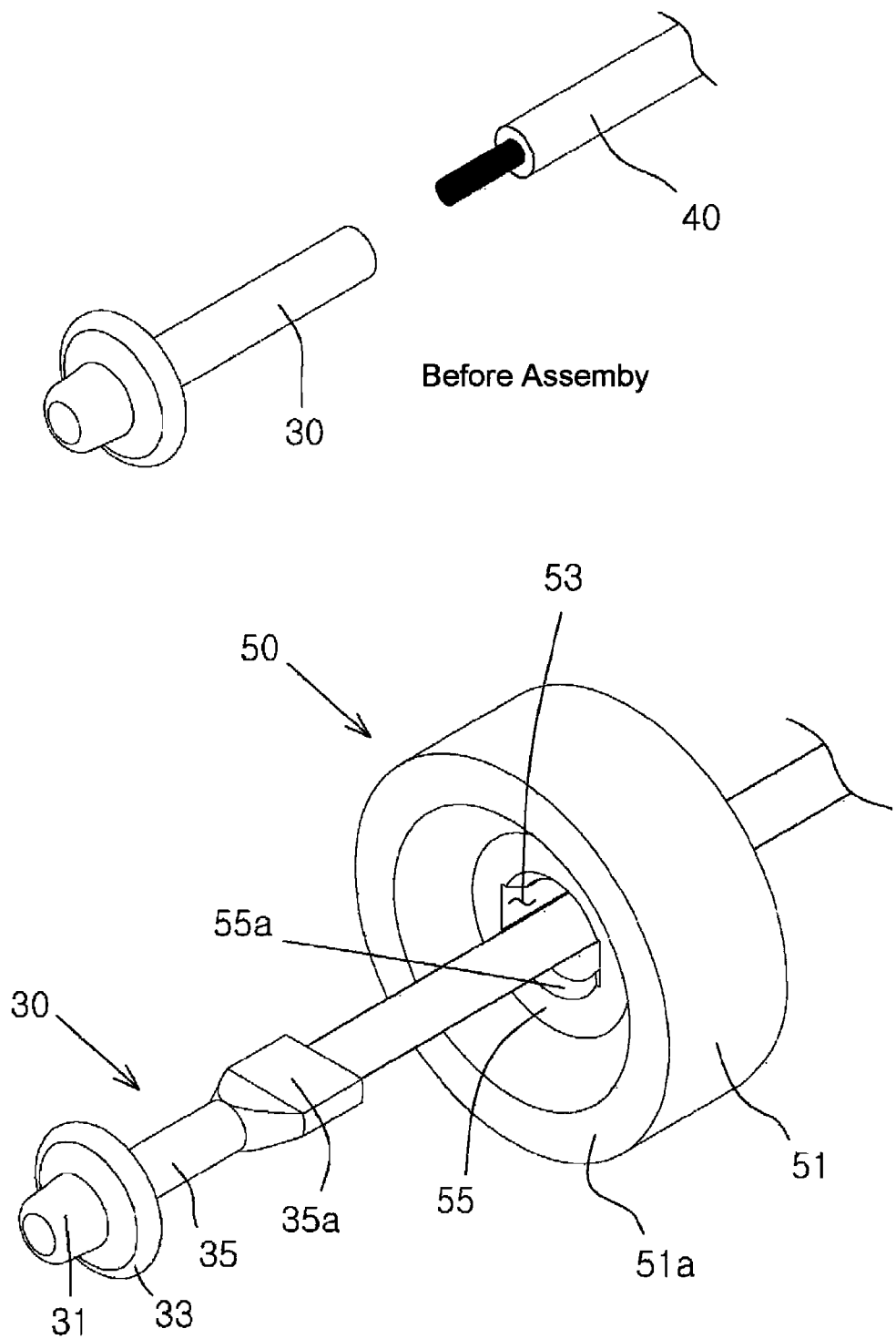
Before Assemby

[Fig. 4]
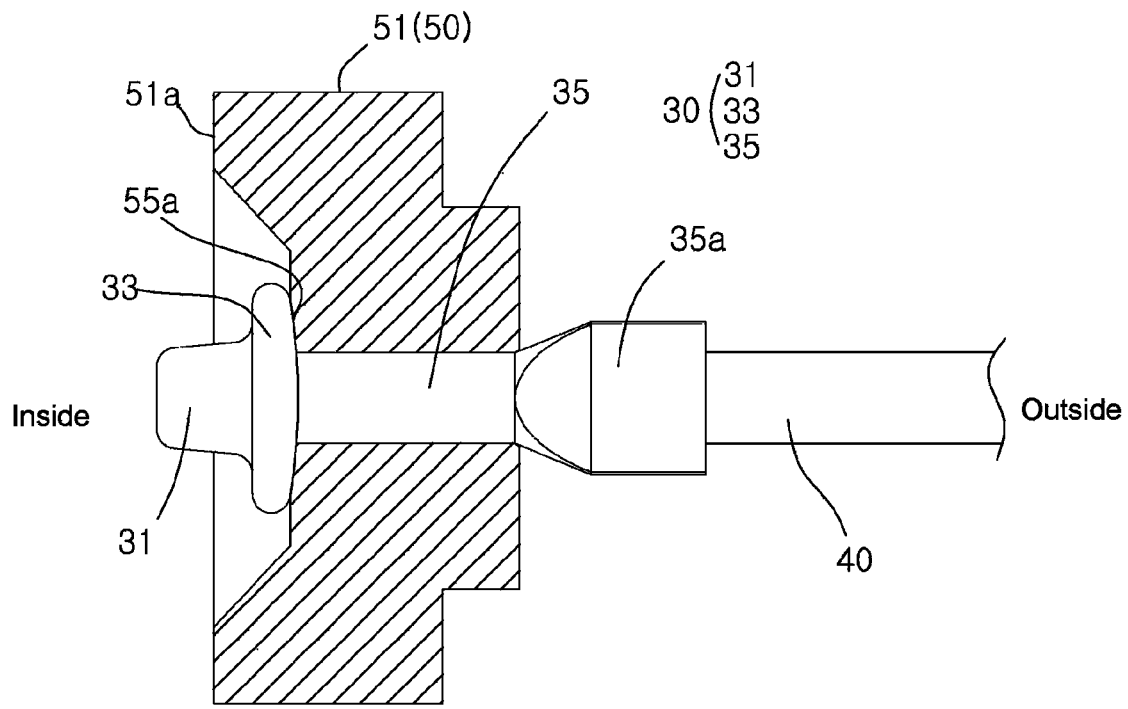
(a) Cross Section
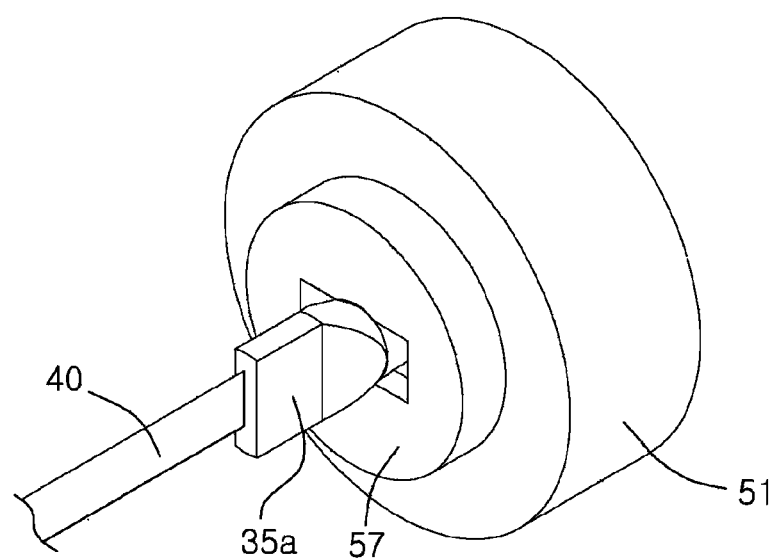
(b) Rear View

[Fig. 5]
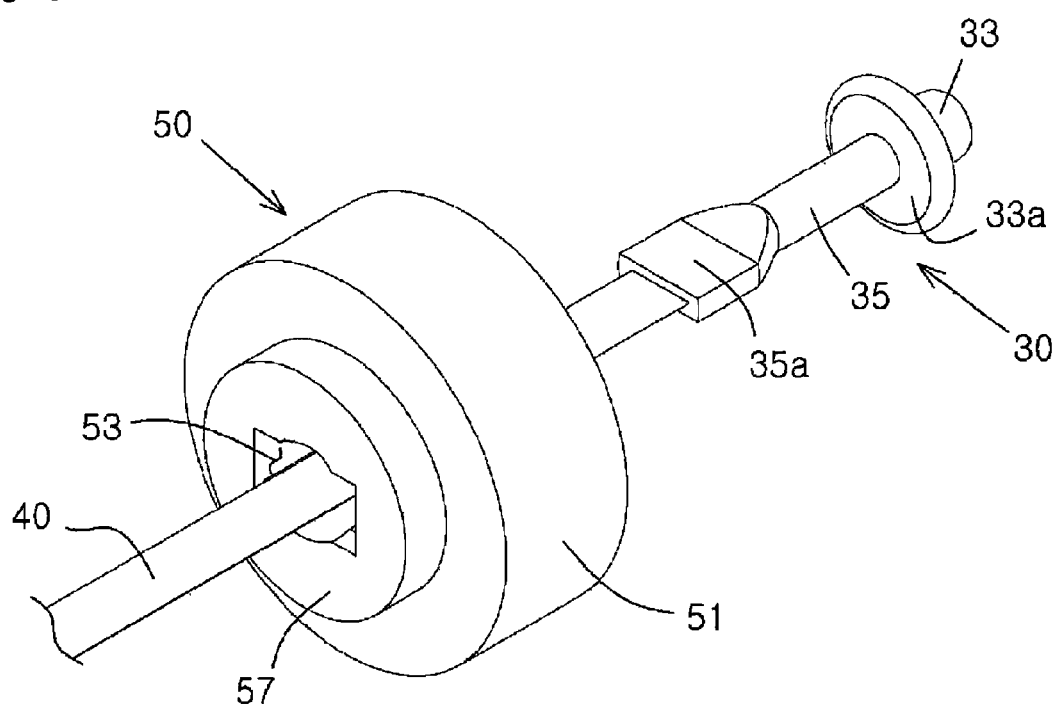
[Fig. 6]
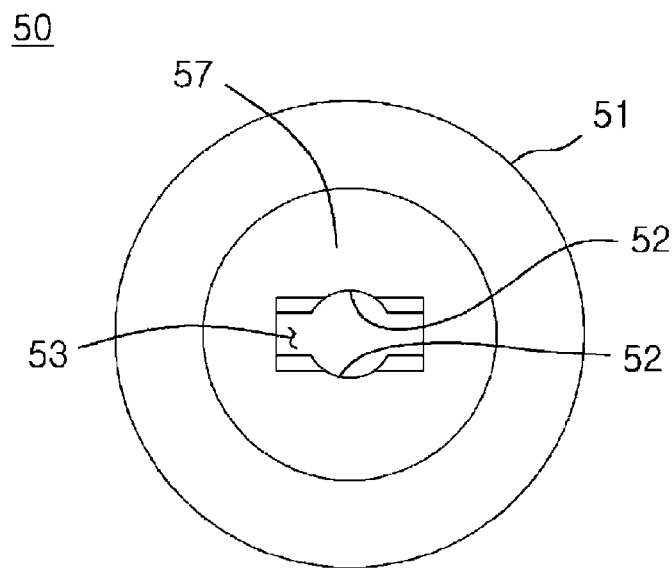

[Fig. 7]
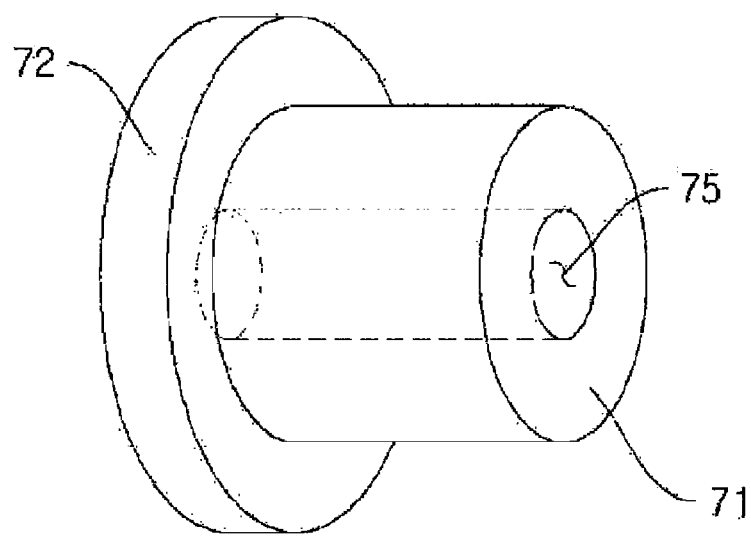
(a)
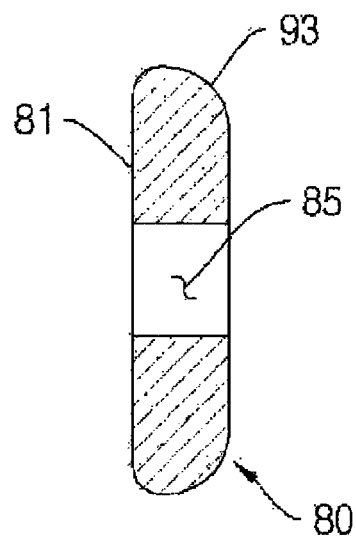
(b)

WATERPROOF SOCKET-TYPE HALOGEN LAMP FOR LIVESTOCK BARN WITH IMPROVED HANDLING

BACKGROUND

The present invention relates to a waterproof socket-type halogen lamp for a livestock barn which can be easily repaired during a failure.

A halogen lamp for a livestock barn in the related art does not have a waterproof function and thus there is a problem in that dust, moisture, or water of the livestock or dust, moisture, or droplets when a disinfectant is sprayed is permeated to a contact area to cause a circuit short, thereby causing a fire or shortening a lifespan of the lamp.

As a related patent, in Korean Patent Registration No. 10-0917782, an LED lamp having a waterproof function is disclosed. In the LED lamp having a waterproof function, a side part is formed in both sides of a cylindrical light-transmitting case, a coupling protrusion having a regularly hexagonal shape is inwardly formed in an end part of the side part, a sealed space is formed between a heat dissipation body and the light-transmitting case by closely coupling both ends of the dissipation body having a regularly hexagonal shape and six mounting surfaces to the coupling protrusion 3, and a circulation space is formed inside the heat dissipation body to circulate external air. Further, a metal substrate mounted with a plurality of LEDs is mounted on the mounting surface of the dissipation body, a plurality of heat dissipation pieces protrudes inward the mounting surface, a dissipation piece formed at the center is longer than other dissipation pieces among the heat dissipation pieces, and an aeration part with a plurality of aeration holes is coupled and a terminal housing in which a power supply terminal protrudes outward the aeration part in both sides of the light-transmitting case. Further, a connection tube that connects a side part of the light-transmitting case to the terminal housing is formed to electrically connect the metal substrate and the terminal by a wire and thus while the LED mounted in the sealed space is waterproofed, heat generated from the LED is efficiently dissipated through the dissipation pieces by a flow of air flowing in the aeration hole and the circulation space.

SUMMARY OF THE INVENTION

The present invention is directed to provide a waterproof socket-type tube halogen lamp for a livestock barn which can be repaired and exchanged by a user by easily exposing only a contact point without directly exchanging and disassembling the entire socket when a failure occurs by dust, moisture, or a contact defect caused by a circuit short by causes such as a loosened coupling between the contact point and the tube lamp to be easily repaired during a failure.

Further, the present invention is directed to provide a waterproof socket-type tube halogen lamp for a livestock barn which can prevent a circuit short and a failure generated when the coupling between the tube lamp and the contact point is loosened (instable contact point) by supporting the socket by a support part having elasticity and restoration force of a fire-resistant stainless steel material to firmly and stably support the lamp.

Further, the present invention is directed to provide a waterproof socket-type tube halogen lamp for a livestock barn which can solve the problems of a halogen lamp for a livestock barn in the related art which does not have a waterproof function and thus dust, moisture, or water of the livestock or dust, moisture, or droplets when a disinfectant is sprayed is permeated to a contact area to cause a circuit short and then cause a fire or shorten a lifespan of the lamp.

One aspect of the present invention provides a waterproof socket-type halogen lamp for a livestock barn with improved handling including:

a socket part 100 which is constituted by a fixing body 10 forming a hollow part in which a wire 40, an annular insulator 50, and a spring 60 are embedded, a side plate 20 finishing the outside of the fixing body 10, a contact point 30 which is positioned inside the annular insulator 50 and coupled to an inner end of the wire to electrically contact one terminal of the tube halogen lamp 200, a wire 40 which supplies power to the contact point 30 through the hollow part after passing through the side plate 20, an annular insulator 50 insulating the fixing body 20 from the contact point 30 after being inserted and seated in the inside of the hollow part, a spring 60 which is embedded in the hollow part and of which an outer side is supported by the side plate 20, an inner side supports the outer side of the annular insulator 50 to provide restoration force while supporting one terminal of the tube halogen lamp 200 through the contact point 30, and an inner waterproof packing 80 which prevents moisture or dust from penetrating to the inner end of the fixing body 10 and has a closed curve shape with a terminal passing groove 85 through which a lamp terminal housing 210 passes; and a tube halogen lamp 200 in which lamp terminals at both ends are connected with the contact point 30 by two socket parts 100.

The contact point 30 may include a contact terminal 30 protruding inward a front end, an extended locking part 33 which is extended to be larger than a diameter of the curved contact part 31 at the center, and a wire connection part 35 which is formed outside the extended locking part 33 and of which a front strand of the wire 40 is inserted to a wire coupling part 35a at the rear end and pressed to have a flat shape.

The annular insulator 50 may include a cylindrical body 51, a rectangular through hole 53 which is formed at the center of the cylindrical body 51 and has a horizontal width larger than a vertical width, a locking part support surface 55 which is formed at a portion which is more recessed than an inner surface 51a of the cylindrical body 51 to contact-support the outer surface 33a of the extended locking part 33, and a spring support part 57 which protrudes from the outside of the cylindrical body 51 and protrudes to be smaller than a median diameter of the cylindrical body 51.

When the extended locking part 33 contacts the locking part support surface 55 by passing an assembly of the contact point 30 and the wire 40 toward the outside from the inside through the rectangular through hole 53, the wire coupling part 35a having the flat shape may not pass through the rectangular through hole 53 by rotating the assembly of the contact point 30 and the wire 40 to be fixed.

The wire coupling part 35a having the flat shape may pass inwardly through the rectangular through hole 53 by rotating the assembly of the contact point 30 and the wire 40 to expose the contact point 30 outward the annular insulator 50.

According to the present invention, it is possible to provide a waterproof socket-type tube halogen lamp for a livestock barn which can be repaired and exchanged by a user by easily exposing only a contact point without directly exchanging and disassembling the entire socket when a failure occurs by dust, moisture, or a contact defect caused by a circuit short by causes such as a loosened coupling between the contact point and the tube lamp to be easily repaired during a failure.

Further, it is possible to provide a waterproof socket-type tube halogen lamp for a livestock barn which can prevent a circuit short and a failure generated when the coupling between the tube lamp and the contact point is loosened (instable contact point) by supporting the socket by a support part having elasticity and restoration force of a fire-resistant stainless steel material to firmly and stably support the lamp.

Further, it is possible to provide a waterproof socket-type tube halogen lamp for a livestock barn which can solve the problems of a halogen lamp for a livestock barn in the related art which does not have a waterproof function and thus dust, moisture, or water of the livestock or dust, moisture, or droplets when a disinfectant is sprayed is permeated to a contact area to cause a circuit short and then cause a fire or shorten a lifespan of the lamp.

BRIEF DESCRIPTION OF THE INVENTION

FIG. 1 is an entire configuration diagram of a waterproof socket-type halogen lamp for a livestock barn of the present invention.

FIG. 2 is a detailed diagram of a socket part of the waterproof socket-type halogen lamp for a livestock barn of the present invention.

FIG. 3 is a front perspective view of a disassembled state of a annular insulator and a contact point of the socket part of the waterproof socket-type halogen lamp for a livestock barn of the present invention.

FIG. 4 is a configuration diagram of an assembled state of a annular insulator and a contact point of the socket part of the waterproof socket-type halogen lamp for a livestock barn of the present invention.

FIG. 5 is a rear perspective view of a disassembled state of a annular insulator and a contact point of the socket part of the waterproof socket-type halogen lamp for a livestock barn of the present invention.

FIG. 6 is a rear front view of the annular insulator of the present invention.

FIG. 7 is a configuration diagram of a waterproof packing of the present invention.

EXPLANATION OF REFERENCE NUMERALS AND SYMBOLS

10: Fixing part 12: Hollow part 20: Side plate
30: Contact point 31: Contact end 33: Extended locking part
35: Wire connection part 35a: Wire coupling part
40: Wire
50: Annular insulator 51: Cylindrical body
53: Rectangular through hole 55: Locking part support surface
57: Spring support part 80: Inner waterproof packing
85: Terminal passing groove 100: Socket part
200: Halogen lamp 210: Lamp terminal housing

DETAILED DESCRIPTION OF THE INVENTION

Hereinafter, a waterproof socket-type halogen lamp for a livestock barn with improved handling according to an exemplary embodiment of the present invention will be described in detail with reference to the accompanying drawings. FIG. 1 is an entire configuration diagram of a waterproof socket-type halogen lamp for a livestock barn of the present invention, FIG. 2 is a detailed diagram of a socket part of the waterproof socket-type halogen lamp for a livestock barn of the present invention, FIG. 3 is a front perspective view of a disassembled state of a annular insulator and a contact point of the socket part of the waterproof socket-type halogen lamp for a livestock barn of the present invention, FIG. 4 is a configuration diagram of an assembled state of a annular insulator and a contact point of the socket part of the waterproof socket-type halogen lamp for a livestock barn of the present invention, FIG. 5 is a rear perspective view of a disassembled state of a annular insulator and a contact point of the socket part of the waterproof socket-type halogen lamp for a livestock barn of the present invention, FIG. 6 is a rear front view of the annular insulator of the present invention, and FIG. 7 is a configuration diagram of a waterproof packing of the present invention.

As illustrated in FIGS. 1 to 7, the waterproof socket-type halogen lamp for a livestock barn with improved handling includes a socket part 100 which is configured by a fixing body 10 forming a hollow part in which a wire 40, an annular insulator 50, and a spring 60 are embedded, a side plate 20 finishing the outside of the fixing body 10, a contact point 30 which is positioned inside the annular insulator 50, coupled to an inner end of the wire to electrically contact one terminal of the tube halogen lamp 200, a wire 40 which supplies power to the contact point 30 through the hollow part after passing through the side plate 20, an annular insulator 50 insulating the fixing body 20 from the contact point 30 after being inserted and seated in the inside of the hollow part, a spring 60 which is embedded in the hollow part and of which an outer side is supported by the side plate 20, an inner side supports the outer side of the annular insulator 50 to provide restoration force while supporting one terminal of the tube halogen lamp 200 through the contact point 30, and an inner waterproof packing 80 which prevents moisture or dust from penetrating to the inner end of the fixing body 10 and has a closed curve shape with a terminal passing groove 85 through which a lamp terminal housing 210 passes. Further, the waterproof socket-type halogen lamp for a livestock barn includes a tube halogen lamp 200 in which lamp terminals at both ends are connected with the contact point 30 by two socket parts 100.

As illustrated in FIGS. 3 to 7, in the waterproof socket-type halogen lamp for a livestock barn with improved handling, the contact point 30 includes a contact terminal 30 protruding inward a front end, an extended locking part 33 which is extended to be larger than a diameter of the curved contact part 31 at the center, and a wire connection part 35 which is formed outside the extended locking part 33 and a front strand of the wire 40 is inserted to a wire coupling part 35a at the rear end and pressed to have a flat shape.

As illustrated in FIGS. 3 to 7, in the waterproof socket-type halogen lamp for a livestock barn with improved handling, the annular insulator 50 includes a cylindrical body 51, a rectangular through hole 53 which is formed at the center of the cylindrical body 51 and has a horizontal width larger than a vertical width, a locking part support surface 55 which is formed at a portion which is more recessed than an inner surface 51a of the cylindrical body 51 to contact-support the outer surface 33a of the extended locking part 33, and a spring support part 57 which protrudes from the outside of the cylindrical body 51 and protrudes to be smaller than a median diameter of the cylindrical body 51. When the extended locking part 33 contacts the locking part support surface 55 by passing an assembly of the contact point 30 and the wire 40 toward the outside from the inside through the rectangular through hole 53, the wire coupling part 35a having the flat shape does not pass through the rectangular through hole 53 by rotating the assembly of the contact point 30 and the wire 40 to be fixed. The wire coupling part 35a having the flat shape passes inwardly through the rectangular through hole 53 by rotating the assembly of the contact point 30 and the wire 40 to expose the contact point 30 outward the annular insulator 50.

As illustrated in FIGS. 3 to 7, in the waterproof socket-type halogen lamp for a livestock barn with improved handling, seated grooves 52 of the wire coupling part which are concavely formed in a circular arc shape from an outer horizontal side of the rectangular through hole 53 of the annular insulator 50 may be vertically formed, respectively. The outer surface 33a of the extended locking part 33 is convex toward the center, and in order to increase a contact with the convex outer surface 33a of the extended locking part 33, an inclined part 55a may be formed to be concave toward the center of the locking part support surface 55.

As illustrated in FIGS. 1 to 7, in the waterproof socket-type halogen lamp for a livestock barn with improved handling, a second packing insert groove 25 is formed on the side plate 20, an outer waterproof packing 70 made of a heat resistant silicon material is mounted on the second packing insert groove 25 to close the outside of the hollow part, a fixing piece 25 is not vertical to the side plate 20, but inclined downwardly in the outer direction while a fixing piece 25 is not fixed to a shade body of the lamp, the fixing piece 25 and the side plate 20 are integrally formed by one stainless steel plate having bending and restoration, and restoration force is provided inwardly when the fixing piece 25 is fixed to the shade body of the lamp.

The invention claimed is:

1. A waterproof socket-type halogen lamp for a livestock barn with improved handling, comprising:
   a socket part (100) which is constituted by a fixing body (10) forming a hollow part in which a wire (40), an annular insulator (50), and a spring (60) are embedded,
   a side plate (20) finishing the outside of the fixing body (10),
   a contact point (30) which is positioned inside the annular insulator (50) and coupled to an inner end of the wire to electrically contact one terminal of the tube halogen lamp (200),
   the wire (40) which supplies power to the contact point (30) through the hollow part after passing through the side plate (20),
   the annular insulator (50) insulating the fixing body (20) from the contact point (30) after being inserted and seated in the inside of the hollow part,
   the spring (60) which is embedded in the hollow part and of which an outer side is supported by the side plate (20), an inner side supports the outer side of the annular insulator (50) to provide restoration force while supporting one terminal of the tube halogen lamp (200) through the contact point (30), and
   an inner waterproof packing (80) which prevents moisture or dust from penetrating to the inner end of the fixing body (10) and has a closed curve shape with a terminal passing groove (85) through which a lamp terminal housing (210) passes; and
   a tube halogen lamp (200) in which lamp terminals at both ends are connected with the contact point (30) by two socket parts (100),
   wherein the contact point (30) includes a contact terminal (30) protruding inward a front end, an extended locking part (33) which is extended to be larger than a diameter of the curved contact part (31) at the center, and a wire connection part (35) which is formed outside the extended locking part (33) and of which a front strand of the wire (40) is inserted to a wire coupling part (35a) at the rear end and pressed to have a flat shape,
   the annular insulator (50) includes a cylindrical body (51), a rectangular through hole (53) which is formed at the center of the cylindrical body (51) and has a horizontal width larger than a vertical width, a locking part support surface (55) which is formed at a portion which is more recessed than an inner surface (51a) of the cylindrical body (51) to contact-support the outer surface (33a) of the extended locking part (33), and a spring support part (57) which protrudes from the outside of the cylindrical body (51) and protrudes to be smaller than a median diameter of the cylindrical body (51),
   when the extended locking part (33) contacts the locking part support surface (55) by passing an assembly of the contact point (30) and the wire (40) toward the outside from the inside through the rectangular through hole (53), the wire coupling part (35a) having the flat shape does not pass through the rectangular through hole (53) by rotating the assembly of the contact point (30) and the wire (40) to be fixed, and
   the wire coupling part (35a) having the flat shape passes inwardly through the rectangular through hole (53) by rotating the assembly of the contact point 30 and the wire (40) to expose the contact point (30) outward the annular insulator (50).

2. The waterproof socket-type halogen lamp for a livestock barn with improved handling of claim 1, wherein seated grooves (52) of the wire coupling part which are concavely formed in a circular arc shape from an outer horizontal side of the rectangular through hole (53) of the annular insulator (50) may be vertically formed, respectively.

3. The waterproof socket-type halogen lamp for a livestock barn with improved handling of claim 1, wherein The outer surface (33a) of the extended locking part (33) is convex toward the center, and In order to increase a contact with the convex outer surface (33a) of the extended locking part (33), an inclined part (55a) may be formed to be concave toward the center of the locking part support surface (55).

4. The waterproof socket-type halogen lamp for a livestock barn with improved handling of claim 1, wherein a second packing insert groove (25) is formed on the side plate (20), an outer waterproof packing (70) made of a heat resistant silicon material is mounted on the second packing insert groove (25) to close the outside of the hollow part, a fixing piece (25) is not vertical to the side plate (20), but inclined downwardly in the outer direction while a fixing piece (25) is not fixed to a shade body of the lamp, the fixing piece (25) and the side plate (20) are integrally formed by one stainless steel plate having bending and restoration, and restoration force is provided inwardly when the fixing piece (25) is fixed to the shade body of the lamp.

* * * * *